United States Patent [19]

Yoshida

[11] 4,018,850
[45] Apr. 19, 1977

[54] BLOCK POLYMER, SYNTHETIC LEATHER PREPARED THEREFROM AND A METHOD FOR PREPARING THE SAME

[75] Inventor: Shoji Yoshida, Kobe, Japan

[73] Assignee: Honny Chemicals Company, Ltd., Kobe, Japan

[22] Filed: Jan. 16, 1975

[21] Appl. No.: 541,397

Related U.S. Application Data

[63] Continuation-in-part of Ser. No. 507,796, Sept. 20, 1974, abandoned, which is a continuation-in-part of Ser. No. 286,908, Sept. 7, 1972, abandoned.

[52] U.S. Cl. .............................. 428/425; 260/858; 260/33.8 UB; 428/904
[51] Int. Cl.$^2$ ................... C08L 75/06; C08L 75/08
[58] Field of Search ............ 260/858; 428/904, 423

[56] References Cited

UNITED STATES PATENTS

| | | | |
|---|---|---|---|
| 3,585,161 | 6/1971 | Akamatsu et al. | 260/858 X |
| 3,634,544 | 1/1972 | Takeda et al. | 260/858 |
| 3,867,352 | 2/1975 | Akamatsu et al. | 260/858 X |

*Primary Examiner*—Carman J. Seccuro
*Attorney, Agent, or Firm*—Stevens, Davis, Miller & Mosher

[57] ABSTRACT

A polyglutamic ester having hydrogen containing groups which are reactive with an —NCO group and a hydroxyl polyester or a hydroxyl polyether are reacted with an organic diisocyanate and the resulting block polymer in an organic solvent is coated on a cloth to prepare a synthetic leather.

16 Claims, No Drawings

BLOCK POLYMER, SYNTHETIC LEATHER PREPARED THEREFROM AND A METHOD FOR PREPARING THE SAME

This application is a continuation-in-part of application Ser. No. 507,796 filed Sept. 20, 1974 which is a continuation-in-part of application Ser. No. 286,908 filed Sept. 7, 1972 both now abandoned.

This invention relates generally to a block polymer containing urethane groups and useful for making an improved synthetic leather and to methods for the preparation thereof.

Commercial synthetic leathers are generally manufactured by coating cloth with a synthetic resin such as nitrocellulose, polyvinyl chloride, a polyamide or a polyurethane. The cloth may be woven or non-woven and may or may not be pretreated with a synthetic resin. Such products are less heat resistant than natural leather and frequently have a tacky feel so they are less acceptable for making articles of clothing or shoes than natural leather.

It is an object of this invention to provide a novel block polymer which may be used as a coating on cloth to provide a synthetic leather which is devoid of the foregoing disadvantages. Another object of the invention is to provide a novel block polymer containing urethane linkages. A further object of the invention is to provide a novel coating material. A still further object of the invention is to provide an improved synthetic leather.

The foregoing objects and others are accomplished in accordance with this invention by providing a method wherein a polyglutamic acid ester and a substantially linear hydroxyl polyester or hydroxyl polyether are reacted with an organic diisocyanate to form a block polymer containing urethane groups. The polyglutamic ester has two groups reactive with an —NCO group and an average molecular weight of at least about 1550 and preferably less than about 657,000. The polyester may be prepared be esterification of a dibasic acid with a glycol and has a molecular weight of at least about 500 and preferably not above about 5000. The polyether may be prepared from an alkylene oxide and has a molecular weight of at least about 500 and preferably not above 4000.

Polyglutamic acid esters are soluble in organic solvents such as dichloroethane, trichloroethylene, formic cid, acetic acid, monochloroacetic acid, dichloroacetic acid and trichloroacetic acid. The use of these solvents is somewhat limited, however, because the viscosity of the polyglutamic ester in pure or mixed solvents varies due to the conformational transformation between the random and helical structure. Generally, polyglutamic esters have excellent heat and abrasion resistance, impact strength, and a good feel but they have poor elasticity and elongation. The block polymer provided by the invention retains the good properties of polyglutamic acid esters and also has improved elasticity and elongation. The block polymer is usually prepared in an organic solvent for the reactants and the resulting polymer in solvent is applied by conventional coating procedures to a cloth, woven or non-woven, to produce a synthetic leather.

The polyglutamic acid may be d-polyglutamic acid or l-polyglutamic acid or mixtures thereof. The polyglutamic acid may be prepared in accordance with the process described in the book entitled "The Chemistry of the Amino Acids" Vol. 2, by Greenstein and Winitz, published by John Wiley and Sons, Inc. (1961). For example, the glutamic γ-methyl ester may be prepared by bubbling hydrogen chloride gas through 1000 cubic centimeters of a methanol solution containing one mole of l- or d- glutamic acid until the glutamic acid is completely dissolved. The solution is neutralized with pyridine or a tertiary amine and the resulting precipitate is recrystallized from a mixture of 70 parts methanol and 30 parts water. Glutamic acid anhydride is prepared by passing phosgene into a suspension of powdered glutamic γ-methyl ester in dioxan. The excess phosgene is removed from the solution by bubbling nitrogen or dry air through it. The dioxan is removed under reduced pressure and the white colored glutamic acid anhydride thus obtained is recrystallized from ethyl acetate-petroleum ether.

The glutamic acid anhydride may be polymerized to form polyglutamic acid ester by dissolving the anhydride in dichloroethane, tetrahydrofuran or dioxan, adding 0.05 mole percent of a secondary or tertiary amine as the catalyst and stirring the solution at from ambient temperature to 40° C under a nitrogen atmosphere.

A block polymer may be prepared from the polyglutamic acid ester (average molecular weight 100,000) by first dissolving about 70 parts by weight of the polymer and 30 parts of a polyester or polyether (average molecular weight 1500) in a mixture of dichloroethane and trichloroethane in a ratio of about 10 parts polymer and 90 parts by weight solvent. About 5 parts by weight of 1,6-hexamethylene diisocynate are added to the solution and the solution is heated to 70–80° C for about 8 hours to form a block polymer containing urethane groups. The block polymer is colorless and transparent. A film of the block polymer has an elongation 40% greater than the elongation of the polyglutamic ester used to make it. The viscosity of a solution of the polyglutamic ester in a mixture of dichloroethane and trichloroethane will increase after standing one day. However, the viscosity of a solution of the block polymer in the same solvents will not change significantly even upon one month's storage.

The polyglutamic ester contemplated by the invention has the following formula:

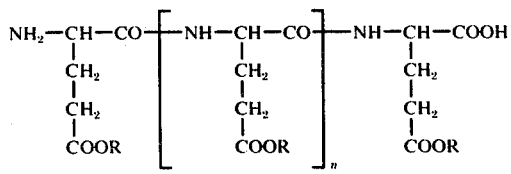

wherein $n$ is an integer of more than 5 and not more than 3000; R is methyl (polyglutamic γ-methyl ester), ethyl (polyglutamic γ-ethyl ester), butyl (polyglutamic γ-butyl ester) or benzyl (polyglutamic γ-benzyl ester) or the like.

The terminal groups of the polymer are —COOH or —NH$_2$.

The polyesters contemplated by the invention are substantially linear polymers having a molecular weight of from about 500 to about 5000. They may be prepared by esterifying any suitable glycol and dibasic acid. Ethylene glycol, diethylene glycol, propylene glycol, dipropylene glycol, neopentyl glycol, 1,4-butylene glycol, 1,3-butylene glycol or the like may be used. Any suitable dibasic acid or anhydride such as, for example, maleic acid, maleic anhydride, fumaric acid, itaconic acid, phthalic acid, phthalic anhydride, isophthalic acid, adipic acid, sebacic acid or the like may be used.

The polyethers contemplated by the invention are linear poly(alkylene ether) glycols having the formula HO[R-O-R]$_n$OH wherein $n$ is an integer and the molecular weight is from about 500 to about 4000.

The polyethers are prepared by ring cleavage polymerization or copolymerization of cyclic ethers such as ethylene oxide, propylene oxide, trimethylene oxide, butylene oxide, tetrahydrofuran, dioxan, or the like.

Any suitable organic diisocyanate may be used such as, for example, tetramethylene diisocyanate, pentamethylene diisocyanate, hexamethylene diisocyanate, octamethylene diisocyanate, tolylene-2,4-diisocyanate, tolylene-2,6-diisocyanate, diphenylmethane-4,4-diisocyanate, 2-nitrodiphenyl-4,4'-diisocyanate diphenylpropane-4,4'-diisocyanate, n-phenylene diisocyanate, p-phenylene diisocyanate, m-xylylene diisocyanate, p-phenylene diisocyanate, or mixtures thereof, and the like.

The preferred ratio of -NCO to total reactive hydrogen containing groups in the reaction mixture is from about 1.1 to about 10 —NCO groups per reactive hydrogen atom.

Any suitable solvent for the reactants may be used for the block polymerization process such as the organic solvents m-cresol, chloroform, dichloromethane, dichloroethane, trichloroethane, trichloroethylene, tetrachloroethane, tetrachloroethylene, pentachloroethane, monochloropropane, dichloropropane, dichloropropylene, trichloropropane, halogenated acetic ester, tetrahydrofuran, methyl ethyl ketone, acetic ester, toluene, mixtures thereof, or the like.

When a large amount of polyester is used for the synthesis of a block polymer, halogenated acetic ester and similar solvents should be used in as small an amount as possible. Solvents like formic acid and acetic acid, which react with diisocyanates, should be avoided.

In order to obtain block polymers having good elasticity, superior elongation and high stability compared to those of polyglutamic ester itself, amounts of polyester or polyether in the block polymer described above should be more than 10% by weight of the polymer. When the elongation of the block polymer should be greater than 150%, more than 30% by weight polyester or polyether should be used.

More stable solutions are obtained when larger amounts of polyester or polyether are used. However, as the number of urethane bonds in the polymer is increased, the viscosity becomes increasingly less stable.

Furthermore, if a large amount of polyester or polyether is used in the block polymer, the good feel, which is an intrinsic feature of polyglutamic ester is gradually lost.

Thus, the amount of polyester or polyether used should be limited to less than 50% by weight. The block polymer obtained by the process of this invention may be used in a wide range of coatings such as a paint and an adhesive or as a film on a substrate such as cloth or the like.

Particularly the film produced from the block-polymer according to the method of the present application has excellent texture, abrasion resistance, flex cracking resistance and adhesion.

Such characteristics are suitable to use as coating and adhesive agents for treating synthetic leathers, natural leathers, papers and fibers.

The present invention produces synthetic leather which is comparable to natural leather in surface characteristics. The block polymers may be coated on woven or non-woven cloth of natural, synthetic or regenerated fibers to obtain a synthetic leather. The cloth may be used with or without pretreatment with synthetic resins. The coating of the block polymer may be applied by the ordinary coating methods such as printing, spraying, rolling or doctor blade coating. The film prepared from a mixture of polyglutamic ester, polyester, polyether and diisocyanate has a semi-transparent appearance. The impact strength and elongation properties of the film are similar or superior to those of polyglutamic ester alone.

The formation of a block polymer may be confirmed by measuring infrared spectra of the residue obtained by the extraction of the polymer with tetrahydrofuran, methyl ethyl ketone or toluene. The elongation may be determined on a thin film with a Schopper type tensile strength tester.

The invention is further described in the following examples, but it is to be understood that the scope of this invention is not to be limited to the examples described herein. In each instance parts are in parts by weight.

EXAMPLE 1

60 parts poly-l-glutamic-$\gamma$-methyl ester having an average molecular weight of 150,000 and 40 parts polyester having an average molecular weight of 3,800 and an acid number of 0.8 prepared by esterifying adipic acid (0.7 mole), phthalic anhydride (0.3 mole), ethylene glycol (0.8 mole), and ethylene diglycol (0.4 mole), are dissolved in a mixture of 450 parts dichloroethane and 450 parts trichloroethylene. To the solution, 3.6 parts 1,6-hexamethylene diisocyanate are added under a nitrogen atmosphere and the solution is heated at 70° C for 6 hours. A film made from the polymer thus obtained is colorless and transparent. Infrared spectrum of the film shows an absorption at 1600 cm$^{-1}$, 700 cm$^{-1}$ for the benzene ring of phthalic anhydride and at 1535 cm$^{-1}$ for the polyurethane type bonding. The elongation is increased by 55% compared to that of poly l-glutamic-$\gamma$-methyl ester alone.

The viscosity of a solution of the polymer does not change even after standing 15 days at room temperature.

A coating material prepared from the block polymer product obtained by printing a polyurethane pretreated cloth has a good feel and other advantageous features. It is comparable to those of natural leather in surface characteristics. A synthetic leather prepared by coating cloth with a solution of the block polymer has excellent impact strength and heat resistance.

EXAMPLE 2

50 parts poly-l-glutamic-$\gamma$-benzyl ester having an average molecular weight of 60,000 and 50 parts polyester having an average molecular weight 550 and an acid number of 1.5 prepared by esterifying adipic acid (0.6 mole), isophthalic acid (0.4 mole) and ethylene glycol (1.5 mole), are dissolved in a mixture of 720 parts dichloroethane and 180 parts toluene. To the solution, 15 parts xylylene diisocyanate are added and reacted under a nitrogen atmosphere at 65° C for 7 hours to produce a block polymer. A film made from the block polymer is colorless and transparent, and shows the polyurethane type bonding by infrared spectrum measurements.

The elongation of the product is 70% greater than the elongation of the poly-l-glutamic-γ-benzyl ester used to prepare it.

The viscosity of a solution of the polymer does not change in storage over 15 days. The solution of block polymer is printed on a polyurethane pretreated nonwoven cloth. The synthetic leather thus obtained has a "feel" comparable to that of natural leather.

EXAMPLE 3

60 parts poly-l-glutamic-γ-methyl ester and 40 parts polyethylene glycol having an average molecular weight of 600 are dissolved in 900 parts dichloroethane. To the solution, 15 parts 1,6-hexamethylene diisocyanate are added and the solution is heated under a nitrogen atmosphere at 70° C for 8 hours. The viscosity of the block polymer obtained is high and a film of the polymer is transparent.

The elongation of the block polymer is 100–150% greater than that of the polyglutamic-γ-methyl ester used to make it. A coating material prepared from the block polymer using a doctor blade coater on a nylon pretreated cloth has a good feel, good flex cracking, and high abrasion resistance. These properties are comparable to those of natural leather.

EXAMPLE 4

A high viscosity polymer is synthesized by reaction of 70 parts of poly-l-glutamic-γ-benzyl ester and 30 parts polytetramethylene ether glycol having an average molecular weight of 800 with 13 parts xylylene diisocyanate as described in Example 3.

A coating material prepared from the block polymer thus obtained is spray coated on an amino acid pretreated synthetic leather cloth to produce a synthetic leather having good heat and abrasion resistances. The surface aesthetic and hand feeling of the material are comparable to those of natural leather.

EXAMPLE 5

60 parts poly-l-glutamic-γ-methyl ester having an average molecular weight of 60,000 and 40 parts polyester having an average molecular weight of 2,000 prepared by esterifying adipic acid (1.0 mole), ethylene glycol (1.5 mole) are dissolved in a mixture of 540 parts dichloroethane. To this solution, 6 parts diphenyl methane-4.4′-diisocyanate are added under a nitrogen atmosphere and the solution is heated at 60°–70° C. for 6 hours.

To avoid increase in viscosity of the solution during the reaction 100 parts of dimethylformamide were added in two or three portions. Finally, to the solution, 500 parts of benzyl alcohol were added and the resulting product was coated using a spraying method on polymer-coated tanned hide.

The product exhibits excellent finishing without damaging hide-texture.

EXAMPLE 6

50 parts poly-l-glutamic-γ-benzyl ester having an average molecular weight of 60,000 and 50 parts polyester having an average molecular weight 550 and an acid number of 1.5 prepared by esterifying adipic acid (0.6 mole), isophthalic acid (0.4 mole) and ethylene glycol (1.5 mole), are dissolved in a mixture of 720 parts dichloroethane and 180 parts toluene. To the solution, 15 parts xylylene diisocyanate are added and reacted under a nitrogen atmosphere at 75° C for 7 hours to produce a block polymer. A film made from the block polymer is colorless and transparent, and shows the polyurethane type bonding by infrared spectrum measurements.

The elongation of the product is 70% greater than the elongation of the poly-l-glutamic-γ-benzyl ester used to prepare it.

The viscosity of a solution of the polymer does not change in storage over 15 days. The solution of block polymer is printed on a polyurethane preteated nonwoven cloth. The synthetic leather thus obtained has a "feel" comparable to that of natural leather.

EXAMPLE 7

60 parts poly-l-glutamic-γ-methyl ester having an average molecular weight of 60,000 and 40 parts polyester having an average molecular weight of 2,000 prepared by esterifying adipic acid (1.0 mole), ethylene glycol (1.5 mole) are dissolved in a mixture of 540 parts dichloroethane. To the solution, 6 parts diphenyl methane-4.4′-diisocyanate are added under a nitrogen atmosphere and the solution is heated at 80° C for 6 hours.

To avoid increase in viscosity of the solution during the reaction 100 parts of dimethylformamide were added in two or three portions. Finally, to the solution, 500 parts of benzyl alcohol were added and the resulting product was coated using a spraying method on polymer-coated tanned hide.

The product exhibits excellent finishing without damaging hide-texture.

Any suitable monohydric alcohol may be used in preparing the glutamic acid ester so R in the foregoing formula may be any alkyl group which does not contain groups reactive with a diisocyanate.

Although the invention has been described in detail for the purpose of illustration, it is to be understood that such detail is solely for that purpose and that variations can be made therein by those skilled in the art without departing from the spirit and scope of the invention except as it may be limited by the claims.

I claim:

1. A method for making a block copolymer which comprises mixing together in an organic solvent therefor, a polyglutamic ester having terminal carboxyl and amino groups and a molecular weight of at least about 1550, a reactive hydrogen containing polyether or polyester having a molecular weight of at least about 500, and an organic diisocyanate in proportions which provide from 0.88 to 10 NCO groups per reactive hydrogen atom in the resulting mixture and provide from 10% to 50% by weight based on the weight of block copolymer of polyester or polyether units in the block copolymer and in such a manner that prereaction of the organic diisocyanate with one of the polyglutamic ester and the polyether or polyester to the exclusion of the other is avoided, and heating the solution so formed to achieve reaction between the polyglutamic ester, polyether or polyester and organic diisocyanate.

2. The method of claim 1 wherein the polyglutamic ester has an average molecular weight of from about 1550 to about 657,000.

3. The method of claim 1 wherein the ratio of —NCO groups to total reactive hydrogen containing groups in the reaction mixture is from about 1.1 to 10 —NCO groups per reactive hydrogen atom, the temperature of the reaction mixture is 70° to 80° C. and the resulting block copolymer contains between more than 10% and less than 50% by weight polyester or polyether.

4. The method of claim 1 wherein a polyglutamic ester and a polyester are reacted with the diisocyanate.

5. The method of claim 1 wherein a polyglutamic ester and a polyether are reached with the diisocyanate.

6. The method of claim 4 wherein the polyester has a molecular weight of from about 500 to about 5000.

7. The method of claim 5 wherein the polyester has a molecular weight of from about 500 to about 4000.

8. A method for making a coating material which comprises reacting the compounds of claim 1 in an organic solvent for the reactants.

9. The method of claim 8 wherein the polyglutamic ester and a polyester are reacted with the diisocyanate.

10. The method of claim 8 wherein a polyglutamic ester and a polyether are reacted with the diisocyanate.

11. The method of making a synthetic leather which comprises coating a cloth substrate with the product of claim 1 and removing the solvent.

12. The method of claim 11 wherein a polyglutamic ester and a polyester are reacted with the diisocyanate.

13. The method of claim 11 wherein a polyglutamic ester and a polyether are reacted with the diisocyanate.

14. The product of the process of claim 1.

15. The product of the process of claim 8.

16. The product of the process of claim 11.

* * * * *